No. 631,095. Patented Aug. 15, 1899.
G. W. SIMPSON.
MAXIMUM THERMOMETER.
(Application filed Sept. 12, 1898.)
(No Model.)
FIG: 1.
FIG: 2.
FIG: 3.
FIG: 4.
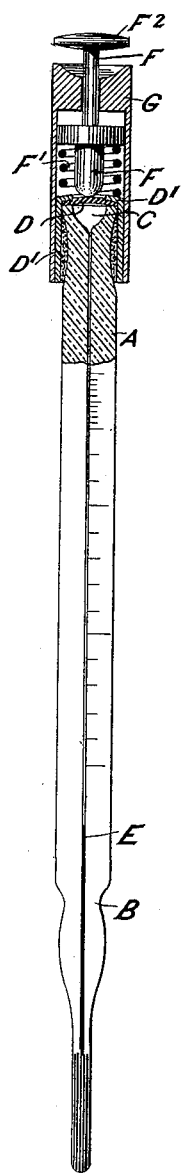
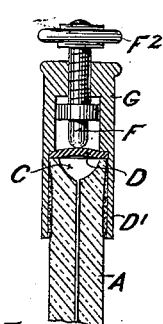
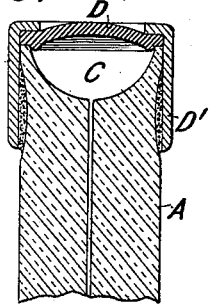
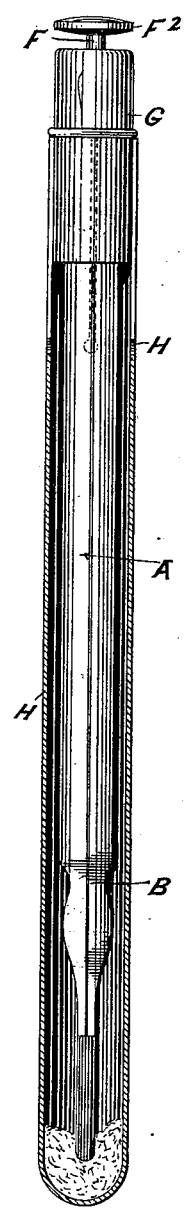
Witnesses
Chas H. Smith
J. Staib
Inventor
George W. Simpson
per L. W. Serrell & Son
Att'ys
THE NORRIS PETERS CO., PHOTO-LITHO., WASHINGTON, D. C.

UNITED STATES PATENT OFFICE.

GEORGE WILLIAM SIMPSON, OF LONDON, ENGLAND.

MAXIMUM THERMOMETER.

SPECIFICATION forming part of Letters Patent No. 631,095, dated August 15, 1899.

Application filed September 12, 1898. Serial No. 690,735. (No model.)

*To all whom it may concern:*

Be it known that I, GEORGE WILLIAM SIMPSON, a subject of the Queen of Great Britain, residing at London, England, have invented new and useful Improvements in Maximum Thermometers, (for which I have made application for patent in Great Britain, dated July 5, 1898, No. 14,783,) of which the following is a specification.

Considerable inconvenience and difficulty is commonly experienced in adjusting the indicating-column of mercury or indicating fluid in maximum thermometers, and particularly in clinical thermometers having very fine bores. Such adjustment is commonly effected by violently shaking the thermometer in order to cause the column or part of the column of mercury or fluid to pass below the constricted part of the bore, so that the upper extremity of the indicating-column of mercury or fluid shall descend below the index or scale upon the tube.

Now the object of my invention is to provide mechanical means whereby the indicating-column can be conveniently acted upon and the adjustment effected without loss of time and with greater certainty than heretofore. With this object in view I construct the tube with an air or gas chamber at the upper part thereof, above the indicating-column and communicating with the bore, and I provide mechanical means whereby the air or gas pressure in the chamber, and consequently in the bore of the tube above the indicating-column, can be momentarily increased when it is desired to adjust the indicating-column, such increase of pressure acting directly to force the column down to its required normal position.

I will describe my invention with reference to the accompanying drawings, whereon—

Figure 1 shows my improved clinical thermometer in vertical section and provided with an elastic diaphragm and plunger for increasing the air or gas pressure in the chamber aforesaid. Fig. 2 is a similar view of the upper part of a thermometer fitted with a screw-acting plunger. Fig. 3 is an enlarged view of the upper end of one of my thermometers where the diaphragm is directly acted upon by the finger of the user, and Fig. 4 shows a clinical thermometer similar to that shown at Fig. 1 and a tubular protecting-case in section.

According to my invention I preferably form the tube A with the usual constriction B, common in fine-bore maximum thermometers, and, referring more particularly to Fig. 1, I form an open cup-shaped chamber C at the upper end of the tube A and communicating with the bore of the said tube. At the open end of the cup-shaped chamber C, I apply an elastic diaphragm D—say, for example, of india rubber—held in place by a metal cap or ferrule D', and the chamber C and the bore of the tube above the indicating-column E contain air, or in some cases they may contain gas.

Mechanical pressure is applied upon the exterior surface of the diaphragm D to increase the pressure of the air between the said diaphragm and the top of the indicating-column for the adjustment of the latter, and at Fig. 1 such pressure is applied by means of a plunger F, guided and capable of sliding in a casing G, fitted over the metal ferrule D'. The plunger F is held up by a spring F' and is provided with a pressure-knob or equivalent $F^2$, by which the plunger can be depressed a predetermined distance when it is desired to force the indicating-column below the index.

Obviously the plunger F may be screw-threaded, as at Fig. 2, and be revolved in order to depress the diaphragm D, or the plunger may be dispensed with and the diaphragm D, as at Fig. 3, made, preferably, with a convex surface to be depressed by the finger of the user.

At Fig. 4 a construction of thermometer as at Fig. 1 is illustrated fitted with an ordinary metal tubular case H, which takes over the lower part of the end casing G. This case H is represented in section.

What I claim as my invention, and desire to secure by Letters Patent, is—

1. In maximum thermometers wherein the column of indicating fluid, after rising past a constriction in the bore of the tube, in accord with the maximum temperature, remains stationary within the bore until forcibly returned by the user, the combination with an air-chamber above the indicating-column, the air-chamber communicating with the bore of the thermometer, of mechanical means for momentarily increasing the pressure of air in the air-chamber in order to force the indicating-column down to its normal position, substantially as set forth.

2. In maximum thermometers wherein the column of indicating fluid, after rising past a constriction in the bore of the tube, in accord with the maximum temperature, remains stationary within the bore until forcibly returned by the user, the combination of a cup-shaped chamber at the end of the tube, the chamber communicating with the bore above the registering-column, and an elastic diaphragm closing the top of the chamber, whereby upon pressure being applied to the diaphragm and the contained air thereby compressed, the indicating fluid is forcibly returned to its normal position, substantially as set forth.

3. In maximum thermometers wherein the column of indicating fluid, after rising past a constriction in the bore of the tube, in accord with the maximum temperature, remains stationary within the bore until forcibly returned by the user, a cup-shaped chamber at the end of the tube communicating with the bore above the registering-column, of an elastic diaphragm closing the top of the chamber, a plunger, located above the diaphragm, to depress the latter when required, and means for guiding the plunger and regulating the distance of its travel, whereby upon the plunger being slid by the user, the diaphragm is acted upon to the required extent, the air thereby compressed and the indicating-column forcibly returned to its normal position, substantially as set forth.

GEORGE WILLIAM SIMPSON.

Witnesses:
J. A. BREWER,
T. W. ROGERS.